US011925945B1

(12) United States Patent
Shi

(10) Patent No.: US 11,925,945 B1
(45) Date of Patent: Mar. 12, 2024

(54) WATER SPRINKLER MAT

(71) Applicant: Dongguan Hongyu Plastic Co., Ltd., Guangdong (CN)

(72) Inventor: Juying Shi, Guangdong (CN)

(73) Assignee: Dongguan Hongyu Plastic Co., Ltd., Guangdong (CN)

( * ) Notice: Subject to any disclaimer, the term of this patent is extended or adjusted under 35 U.S.C. 154(b) by 0 days.

(21) Appl. No.: 18/242,576

(22) Filed: Sep. 6, 2023

(30) Foreign Application Priority Data

Aug. 10, 2023 (CN) ........................ 202322159863.0

(51) Int. Cl.
*B05B 1/20* (2006.01)
*B05B 1/06* (2006.01)
*B05B 17/08* (2006.01)

(52) U.S. Cl.
CPC ................ *B05B 1/06* (2013.01); *B05B 1/207* (2013.01); *B05B 17/08* (2013.01)

(58) Field of Classification Search
CPC ........ A63G 31/007; B05B 1/06; B05B 1/207; B05B 15/625; B05B 17/08; B05B 17/085; F16L 41/021
USPC ..................... 137/561 A, 592; 141/244, 286; 285/133.11
See application file for complete search history.

(56) References Cited

U.S. PATENT DOCUMENTS

| | | | | | |
|---|---|---|---|---|---|
| 3,363,268 | A | * | 1/1968 | Friedlander | E04H 4/0025 239/289 |
| D478,956 | S | * | 8/2003 | Feuer | D21/815 |
| 10,610,794 | B1 | * | 4/2020 | Ruggiero | A63G 31/007 |
| D900,267 | S | * | 10/2020 | Zhang | E04H 4/0025 D21/815 |
| D916,995 | S | * | 4/2021 | Liu | D21/815 |
| D919,731 | S | * | 5/2021 | Han | D21/816 |
| D934,370 | S | * | 10/2021 | Baack | D21/815 |
| D951,382 | S | * | 5/2022 | Zhou | D21/815 |
| D995,686 | S | * | 8/2023 | Gao | D21/815 |
| 2021/0323011 | A1 | * | 10/2021 | Yuan | B05B 1/207 |

* cited by examiner

*Primary Examiner* — Jason J Boeckmann
(74) *Attorney, Agent, or Firm* — COOPER LEGAL GROUP, LLC

(57) ABSTRACT

A water sprinkler mat includes an annular water bag, a base mat and a water inlet mechanism, a radially inner sidewall of the water bag is configured with a plurality of water orifices; the base mat is fixedly connected to the inner sidewall of the water bag; the water inlet mechanism includes a first water inlet pipe and a water distributive pipe, the first water inlet pipe is inserted in the water bag and is fixed with the water bag; the water distributive pipe is located inside the water bag, the first water inlet pipe is configured with a first guide hole, the water distributive pipe extends through the first guide hole and is fixed with the first water inlet pipe; two ends of the water distributive pipe are open, a water inlet opening in communication with the first water inlet pipe is defined at the water distributive pipe.

10 Claims, 7 Drawing Sheets

WATER SPRINKLER MAT

CROSS-REFERENCE TO RELATED APPLICATION

The present application is based on and claims the priority benefits of China application No. 202322159863.0, filed on Aug. 10, 2023. The entirety of China application No. 202322159863.0 is hereby incorporated by reference herein and made a part of this specification.

TECHNICAL FIELD

The present application relates to the field of children's toy, and, in particular, to a water sprinkler mat.

BACKGROUND ART

At present, with the arrival of midsummer, outdoor places such as swimming pools and water recreation are popular among people. In the field of children's entertainment devices, water sprinkler mats are popular children's toys to play on the grass. Common water sprinkler mats usually include a protective mat laid on the ground. The water sprinkler mat is connected to a water pipe in order to be supplied with sufficient water, so that when users play on the water sprinkler mat, jets of water are directed at the center of the water sprinkler mat through the water orifices thereof. Children can play with water in a relatively safe situation.

Existing art discloses a water sprinkler mat for entertainment of children, which includes a water bag and a nozzle body. A protective mat is arranged under the water bag. A water inlet pipe is arranged at one side of the surface of the water bag. Water orifices are configured inside the water inlet pipe. The nozzle body is arranged in the water orifice. An inner bag is arranged inside the water bag. An inner water inlet opening is configured at one end of the nozzle body. One side of the inner water inlet opening is provided with an inner nozzle. A sealing gasket is arranged at one end of the nozzle body. A nozzle nut is arranged outside the nozzle body.

In the process of implementation of this application, the inventor found that there are at least the following problems in the existing technology: since the end of the water inlet pipe is directly connected with the water bag, the entire interior of the inner bag must be firstly filled with water, and then water continues to be injected into the inner bag through the water inlet pipe during the process of filling the inner bag with water through the water inlet pipe. When the water inside the inner bag is sprayed out through the water orifices, the water orifices close to the water inlet pipe tends to be impacted by the water pressure in the water inlet pipe during the process of water squirting, which results in unstable water jet from the water orifices close to the water inlet pipe.

SUMMARY

In order to improve the stability of water jets from water orifices close to the first water inlet pipe, a water sprinkler mat is disclosed.

A water sprinkler mat disclosed adopts the following technical solution:

A water sprinkler mat includes a water bag, a base mat and a water inlet mechanism, the water bag is annular, a radially inner sidewall of the water bag is configured with a plurality of water orifices; an edge of the base mat is fixedly connected to the radially inner sidewall of the water bag; the water inlet mechanism includes a first water inlet pipe and a water distributive pipe, the first water inlet pipe is inserted in the water bag and is fixedly connected with the water bag, an end of the first water inlet pipe located inside the water bag is closed; the water distributive pipe is located inside the water bag, the first water inlet pipe is configured with a first guide hole, the water distributive pipe extends through the first guide hole and is fixedly connected with the first water inlet pipe; two ends of the water distributive pipe are both open, a water inlet opening is defined at the water distributive pipe, and the water inlet opening is in communication with an inside of the first water inlet pipe.

In the above technical solution, since the edge of the base mat is fixedly connected to the inner sidewall of the water bag, children can enjoy themselves while sitting on the base mat. The first water inlet pipe is configured with the first guide hole, the water distributive pipe extends through the first guide hole and is fixedly connected with the first water inlet pipe; in addition, the water inlet opening is defined at the water distributive pipe, wherein the water inlet opening is in communication with the inside of the first water inlet pipe. Therefore, the first water inlet pipe is continuously filled with water, the water in the first water inlet pipe flows into the water distributive pipe through the water inlet opening in the water distributive pipe, and the water in the water distributive pipe is simultaneously injected into the water bag through two ends of the water distributive pipe. After the water bag is filled with water, the water in the water distributive pipe continues to be injected into the water bag through the two ends of the water distributive pipe. The water in the water bag can be sprayed out through the water orifices for children to play. In the case where the water in the first water inlet pipe is sprayed out through the two ends of the water distributive pipe, and the inner diameter of the water distributive pipe is smaller than that of the water bag, the water pressure sprayed out can be increased. Moreover, compared with the existing technique, the water sprayed out will not directly impact the inner sidewall of the water bag, because the water in the first water inlet pipe firstly flows into the water distributive pipe, and then flows out from the two ends of the water distributive pipe, which reduces the impact force of the water on the inner sidewall of the water bag, so that the stability of water jets from the water orifices close to the first water inlet pipe is improved.

Optionally, a guide pipe is fastened on the water bag, the first water inlet pipe extends through the guide pipe and is in sliding fit with the guide pipe; a guide rod is fastened in the guide pipe, the first water inlet pipe is configured with a guide slot, the guide rod is in sliding fit with the guide slot; and the guide pipe is provided with a clamping mechanism for clamping the first water inlet pipe.

In the above technical solution, since the first water inlet pipe extends through the guide pipe and is in sliding fit with the guide pipe, the position of the first water inlet pipe, and thus the position of the water distributive pipe can be adjusted in the length direction of the guide pipe by releasing the clamping action of the clamping mechanism on the first water inlet pipe. Therefore, the impact force of the water jets from the two ends of the water distributive pipe on the inner sidewall of the water bag is reduced. In addition, since the guide rod is fastened in the guide pipe, the first water inlet pipe is configured with the guide slot, and the guide rod is in sliding fit with the guide slot, not only the sliding stability of the first water inlet pipe in the length direction of the guide pipe is increased, but also the first water inlet pipe is prevented from rotating during the adjustment process.

Optionally, the clamping mechanism includes a first sleeve, a mounting block and a bidirectional screw rod; the first sleeve is fixed to an end of the guide pipe, the first water inlet pipe extends through the first sleeve and is in sliding fit with the first sleeve; two opposite sides of the first sleeve each are configured with a groove, each of the grooves is in communication with an inside of the first sleeve; the groove are rectangular grooves, a clamp for clamping the first water inlet pipe is slidably provided in each of the grooves; the mounting block is fixed on the first sleeve, the bidirectional screw rod extends through the mounting block and is rotationally connected with the mounting block, the bidirectional screw rod extends through the two clamps, and the bidirectional screw rod is screwed to the two clamps.

In the above technical solution, the bidirectional screw rod is rotated, so that the bidirectional screw rod drives the two clamps to slide toward each other or away from each other during rotation. When the two clamps clamp the first water inlet pipe, the first water inlet pipe can be fixed on the first sleeve. The grooves not only have the function of guiding the clamps, but also increase the sliding stability of the clamps. The groove is a rectangular groove, thus the clamps can also be prevented from rotating during sliding through the groove, thereby further increasing the sliding stability of the clamps.

Optionally, an end of the bidirectional screw rod is fixed with a grip.

According to the above technical solution, the staff can rotate the bidirectional screw rod by rotating the grips, thereby saving effort.

Optionally, a plurality of mounting grooves are defined in the guide pipe, the plurality of mounting grooves are annular grooves; a sealing ring is provided in each of the plurality of mounting grooves, the sealing ring is located between the guide pipe and the first water inlet pipe.

In the above technical solution, the mounting groove has the function of positioning the sealing ring, which increases the mounting stability of the sealing ring in the guide pipe. In addition, the sealing ring enhances the tightness between the guide pipe and the first water inlet pipe, so as to ensure that the water in the water bag will not flow out from the guide pipe.

Optionally, an arc-shaped groove is defined at an end of the clamp facing the first water inlet pipe, an outer sidewall of the first water inlet pipe abuts against an inner sidewall of the arc-shaped groove, when the two clamps clamp the first water inlet pipe.

The contact area between the clamps and the first water inlet pipe is increased by means of the arc-shaped groove, such that the first water inlet pipe can be clamped more robust by the two clamps.

Optionally, an end of the first water inlet pipe is provided with a coupling sleeve, an end of the coupling sleeve is fixedly provided with a limit block, the limit block is configured with a second guide hole, the first water inlet pipe extends through the second guide hole, the limit block is in sliding fit with the first water inlet pipe; a disengagement prevention ring is fixedly arranged at the end of the first water inlet pipe, the limit block is slidably arranged between the disengagement prevention ring and the first sleeve, and the coupling sleeve is in engagement with the second water inlet pipe through an internal thread.

In the above technical solution, since the end of the first water inlet pipe is provided with a disengagement prevention ring and the limit block is slidably arranged between the disengagement prevention ring and the first sleeve, the disengagement prevention ring and the first sleeve have the function of limiting the limit block, so as to prevent the coupling sleeve from falling off the first water inlet pipe. When the end of the second water inlet pipe abuts against the end of the disengagement prevention ring, the second water inlet pipe and the limit block clamp the disengagement prevention ring because of the engagement of the coupling sleeve with the second water inlet pipe by means of the internal thread, so as to fix the second water inlet pipe at the end of the first water inlet pipe away from the water bag, while the communication between the first water inlet pipe and the second water inlet pipe can be also ensured. At this time, the end of the second water inlet pipe away from the first water inlet pipe is connected to a water pump, and the water pump is placed into the pool. When the water pump is started, the water in the pool will then pass through the second water inlet pipe, the first water inlet pipe and the water distributive pipe successively by means of the water pump, such that the water in the pool can be transferred to the water bag.

Optionally, the water inlet mechanism further includes a fixing assembly, the fixing assembly includes two fasteners; each of the two fasteners includes a second sleeve and a fixing half ring fixedly connected with each other, the second sleeve is sheathed on the water distributive pipe, an inner sidewall of the second sleeve abuts against an outer sidewall of the water distributive pipe, an inner sidewall of the fixing half ring abuts against an outer sidewall of the first water inlet pipe, the two fixing half rings are connected with each other by means of a connecting assembly; a set screw is screwed to the second sleeve, and an end of the set screw abuts against the water distributive pipe.

In the above technical solution, since the two fixing half rings are connected with each other by means of the connecting assembly, the two fixing half rings clamp the first water inlet pipe. In addition, since the set screw is screwed to the second sleeve and the end of the set screw abuts against the water distributive pipe, the set screw and the second sleeve clamp the water distributive pipe, therefore the second sleeve is fixed on the water distributive pipe, such that the secure connection between the first water inlet pipe and the water distributive pipe is ensured, while the convenience for the staff to assemble and disassemble the second sleeve is also improved.

Optionally, the connecting assembly includes a first connecting block, a second connecting block, a bolt and a nut, the first connecting block is fixed on the fixing half ring of a first fastener of the two fasteners, the second connecting block is fixed on the fixing half ring of a second fastener of the two fasteners; the bolt extends through the first connecting block and the second connecting block successively, and the bolt is screwed to the nut.

According to the above technical solution, the nut and the bolt together clamp the first connecting block and the second connecting block, thereby fixing the first connecting block and the second connecting block together, and in turn fixing the two fixing half rings together. The convenience for the staff to assemble and disassemble the two fixing half rings, and thus the fixing assembly is increased.

Optionally, the plurality of water orifices are evenly distributed along a circumference of the water bag, and an angle between each of axes of the plurality of water orifices and a horizontal direction is 60°.

In the above technical solution, since the plurality of water orifices are all located on the radially inner side of the water bag and the plurality of water orifices are evenly distributed along the circumferential direction, the overall aesthetics of the water spayed out is improved. In addition, since the angle between the axis of each of the water orifices and the horizontal direction is 60°, the top of the water jets converges at a point during the water is sprayed out through the water orifices. When a toy ball is placed on the top of the water jets, the toy ball is supported upward by the water, such that the toy ball is jacked up, which increases the fun for children.

In summary, the present application includes at least one of the following beneficial technical effects:

1. Since the edge of the base mat is fixedly connected to the inner sidewall of the water bag, children can enjoy themselves while sitting on the base mat. The first water inlet pipe is configured with the first guide hole, the water distributive pipe extends through the first guide hole and is fixedly connected with the first water inlet pipe; in addition, the water inlet opening is defined at the water distributive pipe, wherein the water inlet opening is in communication with the inside of the first water inlet pipe. Therefore, the first water inlet pipe is continuously filled with water, the water in the first water inlet pipe flows into the water distributive pipe through the water inlet opening at the water distributive pipe, and the water in the water distributive pipe is simultaneously injected into the water bag through two ends of the water distributive pipe. After the water bag is filled with water, the water in the water distributive pipe continues to be injected into the water bag through the two ends of the water distributive pipe. The water in the water bag can be sprayed out through the water orifices for children to play. In the case where the water in the first water inlet pipe is sprayed out through the two ends of the water distributive pipe, and the inner diameter of the water distributive pipe is smaller than that of the water bag, the water pressure sprayed out can be increased. Moreover, compared with the existing technique, the water sprayed out will not directly impact the inner sidewall of the water bag, because the water in the first water inlet pipe firstly flows into the water distributive pipe, and then flows out from the two ends of the water distributive pipe, which reduces the impact force of the water on the inner sidewall of the water bag, so that the stability of water jets from the water orifices close to the first water inlet pipe is improved.
2. Since the first water inlet pipe extends through the guide pipe and is in sliding fit with the guide pipe, the position of the first water inlet pipe, and thus the position of the water distributive pipe can be adjusted in the length direction of the guide pipe by releasing the clamping action of the clamping mechanism on the first water inlet pipe. In addition, since the guide rod is fastened in the guide pipe, the first water inlet pipe is configured with the guide slot, and the guide rod is in sliding fit with the guide slot, not only the sliding stability of the first water inlet pipe in the length direction of the guide pipe is increased, but also the first water inlet pipe is prevented from rotating during the adjustment process.
3. Since the plurality of water orifices are all located on the radially inner sidewall of the water bag and the plurality of water orifices are evenly distributed along the circumferential direction, the overall aesthetics of the water spayed out is improved. In addition, since the angle between the axis of each of the water orifices and the horizontal direction is 60°, the top of the water jets converges at a point during the water is sprayed out through the water orifices. When a toy ball is placed on the top of the water jets, the toy ball is supported upward by the water, such that the toy ball is jacked up, which increases the fun for children.

DETAILED DESCRIPTION

The present application will be described in further detail below with reference to FIGS. 1-7.

The terms used in this application are for the purpose of describing particular embodiments only, and don't intend to limit the application. Unless otherwise defined, the technical terms or scientific terms used in the application shall have the usual meanings understood by those skilled in the art to which the application belongs. "First", "second" and similar words used in this application do not indicate any order, quantity or importance, but are only used to distinguish different components.

Figure 1:
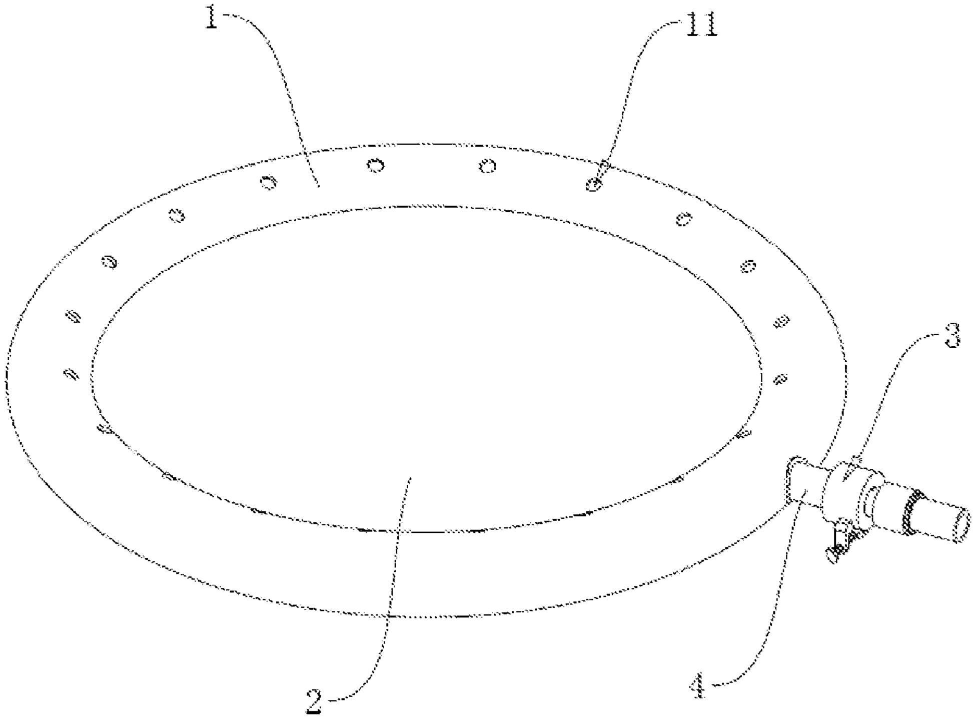
FIG. 1 is a schematic view of the water sprinkler mat in the embodiment of the present application.

The embodiment of the present application discloses a water sprinkler mat. Referring to FIG. 1, the water sprinkler mat includes a water bag 1 and a base mat 2. The water bag 1 is annular. The edge of the base mat 2 is fixedly connected with the inner sidewall of the water bag 1. Children can enjoy themselves while sitting on the base mat 2. The water bag 1 is provided with a water inlet mechanism 3 configured for injecting water into the water bag 1. A plurality of water orifices 11 are defined on the radially inner sidewall of the water bag 1. The plurality of water orifices 11 are evenly distributed along the circumferential direction, which increases the overall aesthetics. In this embodiment, the angle between the axis of each water orifice 11 and the horizontal direction is 60°. Since the plurality of water orifices 11 are all located on the radially inner side of the water bag 1 and the plurality of water orifices 11 are evenly distributed along the circumferential direction, the overall aesthetics of the water spayed out is increased. In addition, since the angle between the axis of each of the water orifices 11 and the horizontal direction is 60°, the top of the water jets converges at a point during the water is sprayed out through the water orifices 11. When a toy ball is placed on the top of the water jets, the toy ball is supported upward by the water, such that the toy ball is jacked up, which increases the fun for children.

Figure 2:
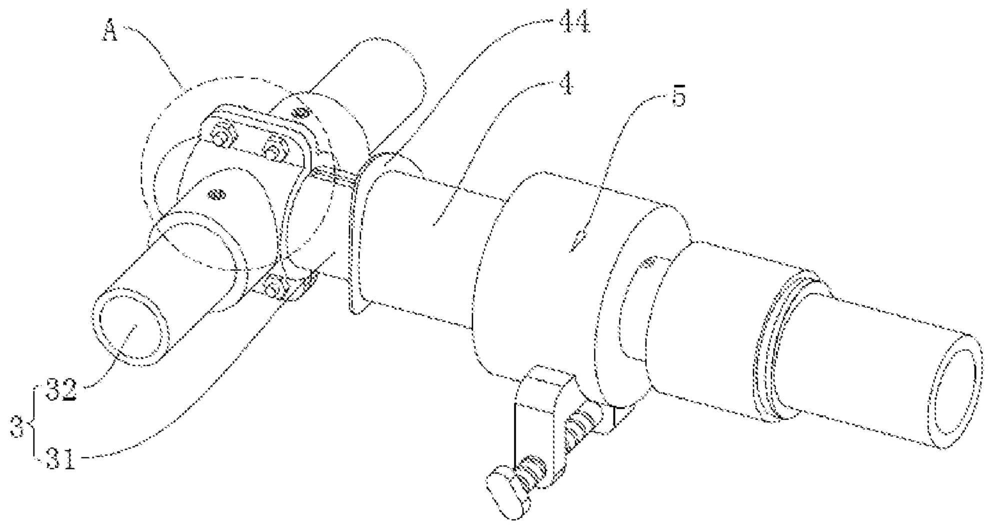
FIG. 2 is a schematic view of the water inlet mechanism, the guide pipe and the clamping mechanism in the embodiment of the present application.

Referring to FIG. 1 and FIG. 2, the water inlet mechanism 3 includes a first water inlet pipe 31 and a water distributive pipe 32. The first water inlet pipe 31 is inserted in the water bag 1 and is fixedly connected with the water bag 1. The end of the first water inlet pipe 31 located inside the water bag 1 is closed. The end of the first water inlet pipe 31 located outside the water bag 1 is open. The water distributive pipe 32 is located inside the water bag 1.

Figure 3:
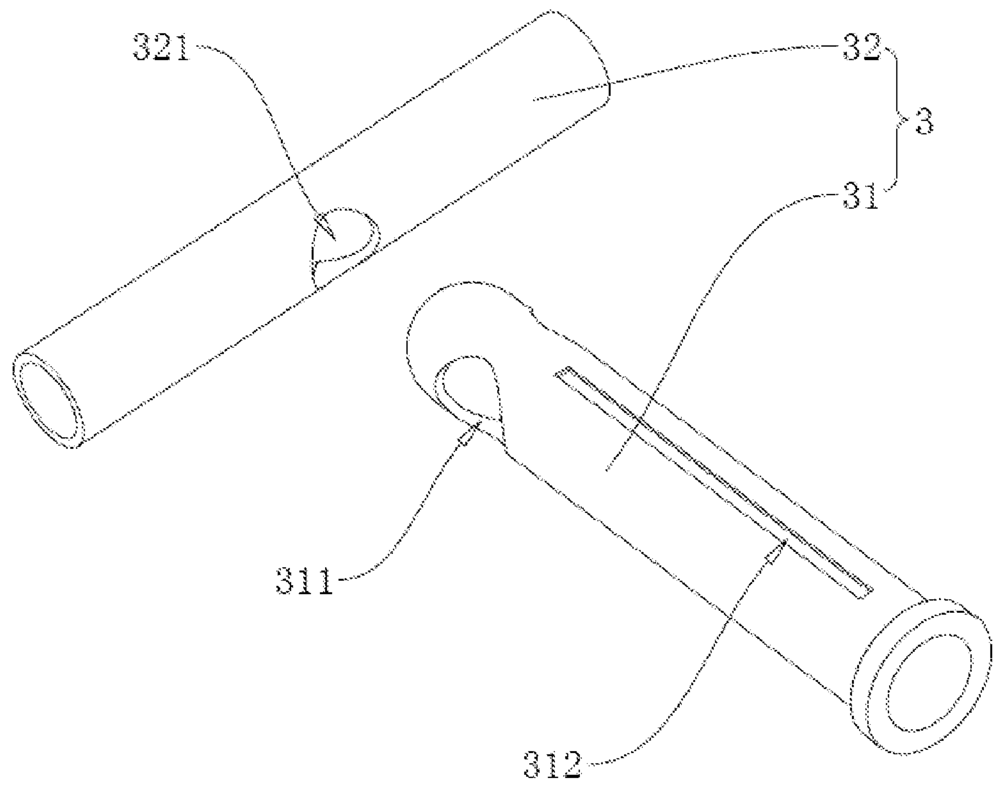
FIG. 3 is a schematic view of the first water inlet pipe and the water distributive pipe in the embodiment of the present application.

Referring to FIG. 3, the first water inlet pipe 31 is configured with a first guide hole 311. The water distributive pipe 32 extends through the first guide hole 311 and is fixedly connected with the first water inlet pipe 31. The water distributive pipe 32 is perpendicular to the first water inlet pipe 31. Two ends of the water distributive pipe 32 are open. The water distributive pipe 32 is configured with a water inlet opening 321. The water inlet opening 321 is in communication with the inside of the first water inlet pipe 31.

Referring to FIG. 1 and FIG. 2, in the way of continuously injecting water into the first water inlet pipe 31, the water in the first water inlet pipe 31 flows into the water distributive pipe 32 through the water inlet opening 321. The water in the water distributive pipe 32 is simultaneously injected into the water bag 1 through the two ends of the water distributive pipe 32. After the water bag 1 is filled with water, the water in the water distributive pipe 32 continues to be injected into the water bag 1 through the two ends of the water distributive pipe. The water in the water bag 1 can be sprayed out through the water orifices 11 for children to play. Since the water in the first water inlet pipe 31 flows towards two ends through the water distributive pipe 32 and the inner diameter of the water distributive pipe 32 is smaller than the inner diameter of the water bag 1, the pressure of the water sprayed out can be increased. In addition, since the water in the first water inlet pipe 31 flows into the water distributive pipe 32 at first, then is sprayed out from the two ends of the water distributive pipe 32, the water sprayed out will not directly impact the inner sidewall of the water bag 1. The impact force of the water on the inner sidewall of the water bag 1 is thus reduced, so that the stability of water jets from the water orifices 11 close to the first water inlet pipe 31 is improved.

Figure 4:
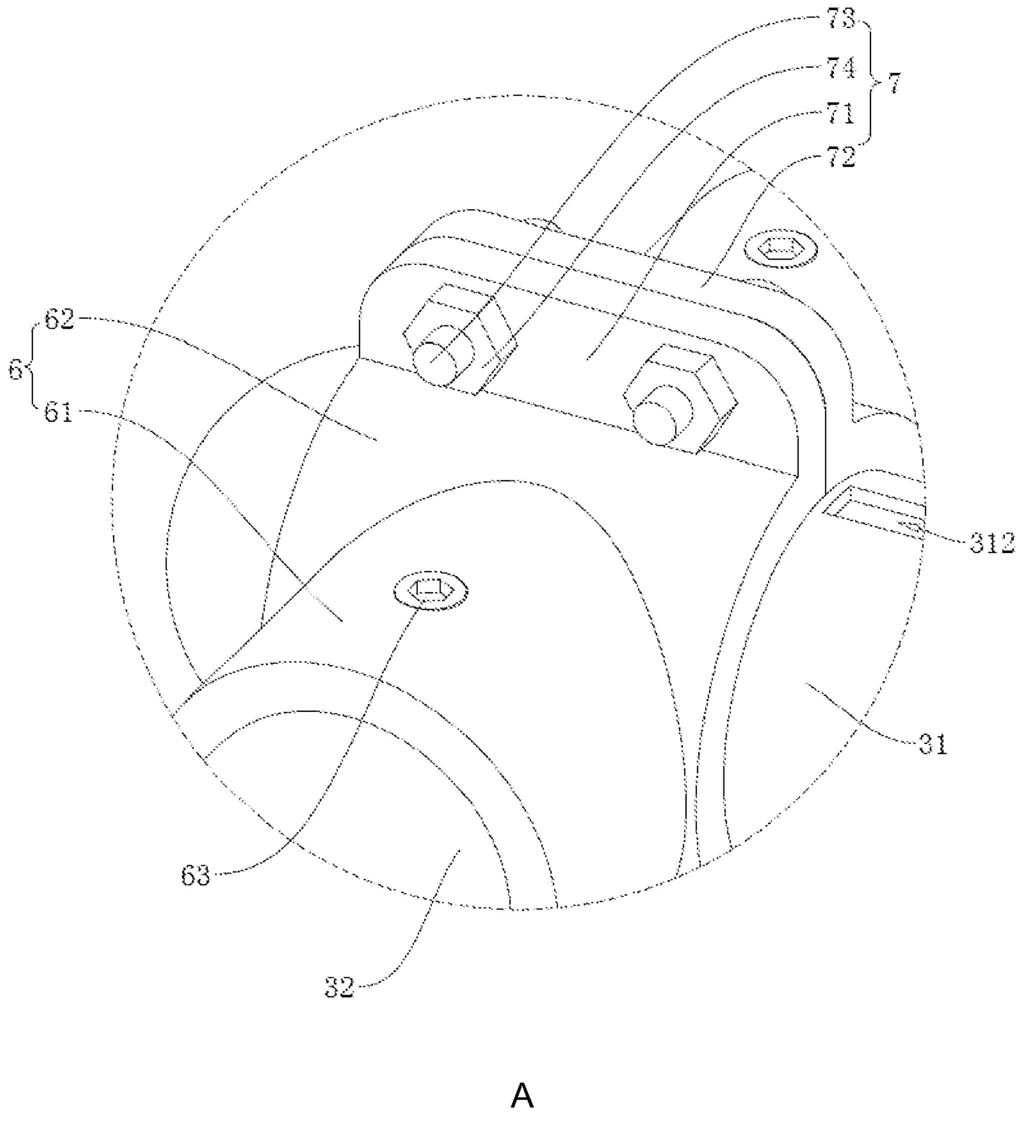
FIG. 4 is a partially enlarged view of part A in FIG. 2.

Referring to FIG. 2 and FIG. 4, the water inlet mechanism 3 further includes a fixing assembly. The fixing assembly includes two fasteners 6. The two fasteners 6 are symmetrical to each other. Particularly, each fastener 6 includes a second sleeve 61 and a fixing half ring 62 which are integrally formed. Two ends of the second sleeve 61 are both open. The second sleeve 61 is sheathed on the water distributive pipe 32. The inner sidewall of the second sleeve 61 abuts against the outer sidewall of the water distributive pipe 32. The inner sidewall of the fixing half ring 62 abuts against the outer sidewall of the first water inlet pipe 31. The two fixing half rings 62 are connected with each other by means of the connecting assembly 7. The convenience for the staff to assemble and disassemble the two fasteners 6 is thus increased. In addition, the two fixing half rings 62 clamp the first water inlet pipe 31, therefore the two fixing half rings 62 are fastened on the first water inlet pipe 31. Each second sleeve 61 is screwed to a set screw 63. The end of each set screw 63 abuts against the water distributive pipe 32. The set screw 63 and the second sleeve 61 clamp the water distributive pipe 32, therefore the second sleeve 61 is fastened on the water distributive pipe 32. In addition, the staff can also adjust the position of the second sleeve 61 in the length direction of the water distributive pipe 32 by releasing the fixation of the second sleeve 61 by the set screw 63, and thereby adjusting the position of the fixing half ring 62 in the length direction of the water distributive pipe 32, so as to ensure that the inner sidewall of the fixing half ring 62 abuts against the outer sidewall of the first water inlet pipe 31.

Referring to FIG. 4, the connecting assembly 7 includes a first connecting block 71, a second connecting block 72, a bolt 73 and a nut 74. The first connecting block 71 is integrally formed at the end of the fixing half ring 62 of one of the fasteners 6. The second connecting block 72 is fixed to the end of the fixing half ring 62 of the other one of the fasteners 6. The bolt 73 extends through the first connecting block 71 and the second connecting block 72 successively. The bolt 73 is screwed to the nuts 74. The nut 74 and the bolt 73 together clamp the first connecting block 71 and the second connecting block 72, thereby fixing the first connecting block 71 and the second connecting block 72 together, and in turn fixing the two fixing half rings 62 together. The convenience for the staff to assemble and disassemble the two fixing half rings 62, and thus the fixing assembly is increased.

Referring to FIG. 1 and FIG. 2, the outer sidewall of the water bag 1 is fixed with a guide pipe 4. The outer sidewall at the end of the guide pipe 4 close to the water bag 1 is further fixed with a connecting ring 44. The connecting ring 44 is bonded to the outer surface of the water bag 1, so as to increase the firmness of the connection between the guide pipe 4 and the water bag 1.

Figure 5:
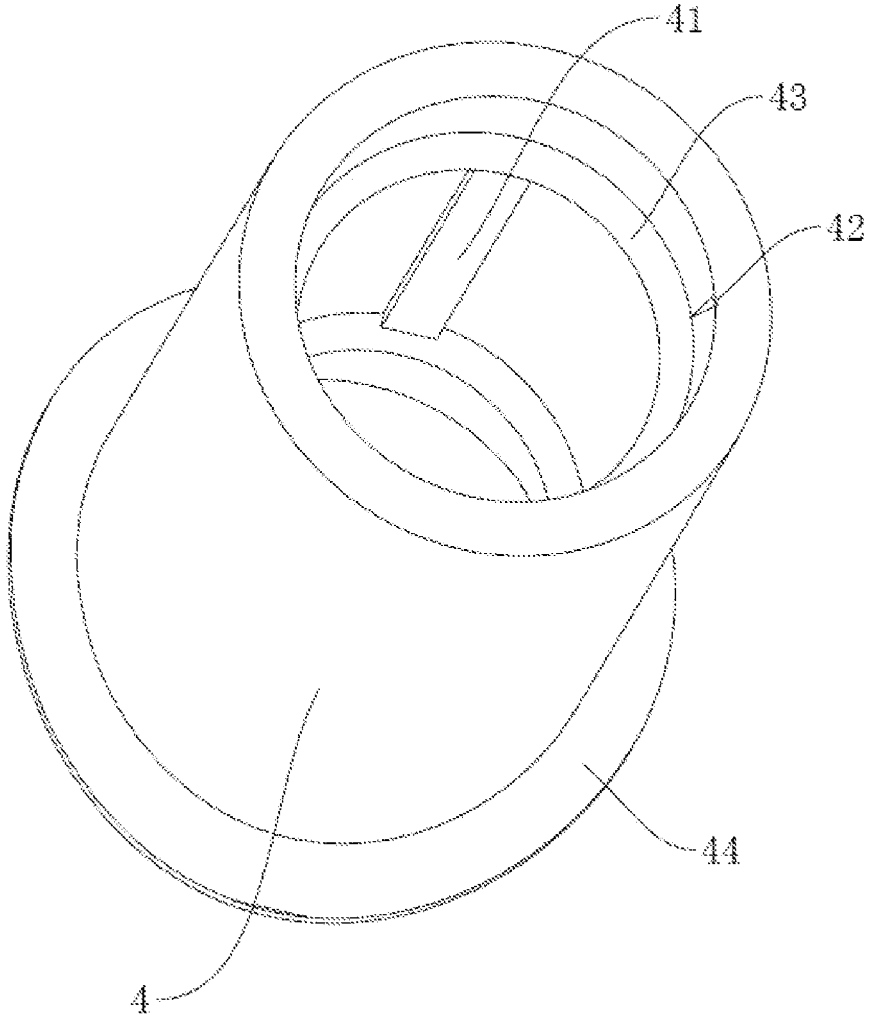
FIG. 5 is a schematic view of the guide pipe in the embodiment of the present application.

Referring to FIG. 3 and FIG. 5, in the present embodiment, the first water inlet pipe 31 extends through the guide pipe 4 and is in sliding fit with the guide pipe 4. A guide rod 41 is fixedly arranged in the guide pipe 4. The length direction of the guide rod 41 is identical with the axis directions of the guide pipe 4. A guide slot 312 is defined at the first water inlet pipe 31. The guide rod 41 is in sliding fit with the guide slot 312. Therefore, not only the sliding stability of the first water inlet pipe 31 in the length direction of the guide pipe 4 is improved, but also the first water inlet pipe 31 is prevented from rotating during the adjustment.

Referring to FIG. 1 and FIG. 2, the guide pipe 4 is provided with a clamping mechanism 5 for clamping the first water inlet pipe 31. The clamping mechanism 5 is configured for fixing the first water inlet pipe 31. Since the first water inlet pipe 31 extends through the guide pipe 4 and is in sliding fit with the guide pipe 4, the position of the first water inlet pipe 31, and thus the position of the water distributive pipe 32 can be adjusted in the length direction of the guide pipe 4 by releasing the clamping action of the clamping mechanism 5 on the first water inlet pipe 31. Therefore, the impact of the water jets from the two ends of the water distributive pipe 32 on the inner sidewall of the water bag 1 is reduced.

Figure 6:
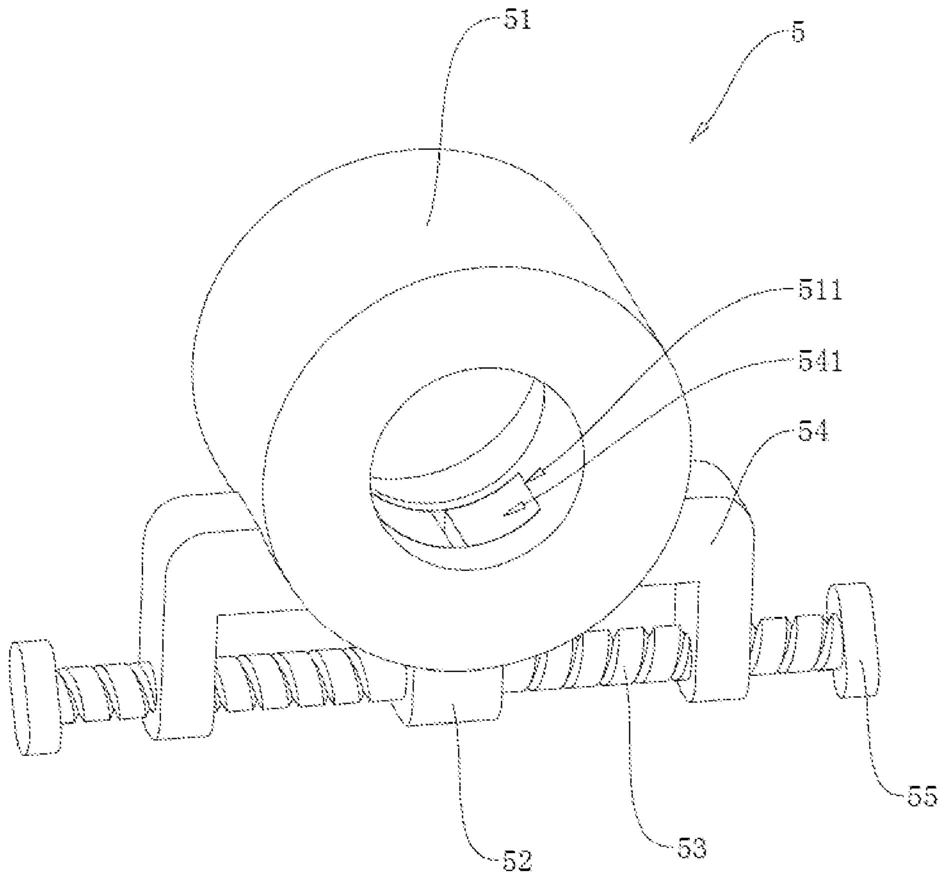
FIG. 6 is a schematic view of the clamping mechanism in the embodiment of the present application.

Referring to FIG. 2 and FIG. 6, the clamping mechanism 5 includes a first sleeve 51, a mounting block 52 and a bidirectional screw rod 53, the first sleeve 51 is sleeved on the end of the guide pipe 4 away from the water bag 1 and fixedly connected with the guide pipe 4. The first water inlet pipe 31 extends through the first sleeve 51 and is in sliding fit with the first sleeve 51. Two opposite sides of the first sleeve 51 each are configured with a groove 511. Each groove 511 is in communication with the inside of the first sleeve 51. A clamp 54 for clamping the first water inlet pipe 31 is slidably arranged in each groove 511. The mounting block 52 is fixed on the outer sidewall of the first sleeve 51. The bidirectional screw rod 53 extends through the mounting block 52 and is rotationally connected with the mounting block 52. The bidirectional screw rod 53 extends through the two clamps 54. The bidirectional screw rod 53 is screwed to the two clamps 54. The bidirectional screw rod 53 is rotated, so that the bidirectional screw rod 53 drives the two clamps 54 to slide toward each other or away from each other during rotation. When the two clamps 54 clamp the first water inlet pipe 31, the first water inlet pipe 31 can be fixed at the first sleeve 51. The grooves 511 not only have the function of guiding the clamps 54, but also increase the sliding stability of the clamps 54. In this embodiment, the groove 511 is a rectangular groove. Therefore, the clamps 54 can also be prevented from rotating during sliding through the groove 511, thereby further increasing the sliding stability of the clamps 54. Each end of the bidirectional screw rod 53 is integrally formed with a grip 55. The staff can rotate the bidirectional screw rod 53 by rotating the grips 55, to save effort. The ends of each grip 55 are provided with rounding chamfer, which can protect the hands of staffs.

Referring to FIG. 6, an arc-shaped groove 541 is defined at the end of the clamp 54 close to the first water inlet pipe 31. The outer sidewall of the first water inlet pipe 31 abuts against the inner sidewall of the arc-shaped groove 541, when the two clamps 54 clamp the first water inlet pipe 31. The contact area between the clamp 54 and the first water inlet pipe 31 is increased by means of the arc-shaped groove 541, such that the first water inlet pipe 31 can be more firmly clamped by the two clamps 54.

Referring to FIG. 1 and FIG. 5, a plurality of mounting grooves 42 are defined in the guide pipe 4. The mounting grooves 42 are annular grooves. A sealing ring 43 is provided in each of the mounting grooves 42. The sealing ring 43 is located between the guide pipe 4 and the first water inlet pipe 31. The mounting groove 42 has the function of positioning the sealing ring 43, which increases the mounting stability of the sealing ring 43 in the guide pipe 4. In addition, the sealing ring 43 enhances the tightness between the guide pipe 4 and the first water inlet pipe 31, so as to ensure that the water in the water bag 1 will not flow out of the guide pipe 4.

Figure 7:
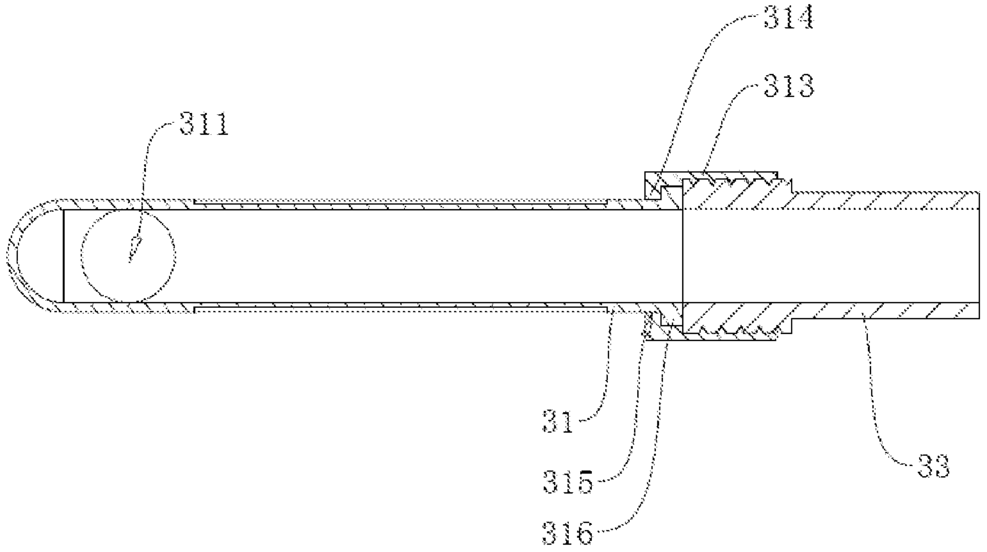
FIG. 7 is a schematic view of the first water inlet pipe, the coupling sleeve and the second water inlet pipe in the embodiment of the present application.

Referring to FIG. 1 and FIG. 7, the end of the first water inlet pipe 31 is provided with a coupling sleeve 313. One end of the coupling sleeve 313 is fixed with a limit block 314. The limit block 314 is configured with a second guide hole 315. The first water inlet pipe 31 extends through the second guide hole 315. The limit block 314 is in sliding fit with the first water inlet pipe 31. A disengagement prevention ring 316 is fixedly arranged at the end of the first water inlet pipe 31. The limit block 314 is slidably arranged between the disengagement prevention ring 316 and the first sleeve 51. The coupling sleeve 313 is fitted with the second water inlet pipe 33 through an internal thread. Since the end of the first water inlet pipe 31 is provided with the disengagement prevention ring 316 and the limit block 314 is slidably arranged between the disengagement prevention ring and the first sleeve 51, the disengagement prevention ring 316 and the first sleeve 51 have the function of limiting the limit block 314, so as to prevent the coupling sleeve 313 from falling off the first water inlet pipe 31. When the end of the second water inlet pipe 33 abuts against the end of the disengagement prevention ring 316, the second water inlet pipe 33 and the limit block 314 clamp the disengagement prevention ring 316 because of the engagement of the coupling sleeve 313 with the second water inlet pipe 33 by means of the internal thread, so as to fix the second water inlet pipe 33 at the end of the first water inlet pipe 31 away from the water bag 1, while the communication between the first water inlet pipe 31 and the second water inlet pipe 33 can be also ensured. At this time, the end of the second water inlet pipe 33 away from the first water inlet pipe 31 is connected to a water pump, and the water pump is placed into the pool. When the water pump is started, the water in the pool will then pass through the second water inlet pipe 33, the first water inlet pipe 31 and the water distributive pipe 32 successively by means of the water pump, such that the water in the pool is transferred to the water bag 1.

The implementation principle of the above-mentioned embodiment is as follows. Since the edge of the base mat 2 is fixedly connected to the inner sidewall of the water bag 1, children can enjoy themselves while sitting on the base mat 2. The first water inlet pipe 31 is configured with the first guide hole 311, the water distributive pipe 32 extends through the first guide hole 311 and is fixedly connected with the first water inlet pipe 31; in addition, the water inlet opening 321 is defined on the water distributive pipe 32, wherein the water inlet opening 321 is in communication with the inside of the first water inlet pipe 31. Therefore, the first water inlet pipe 31 is continuously filled with water, the water in the first water inlet pipe 31 flows into the water distributive pipe 32 through the water inlet opening 321 in the water distributive pipe 32, and the water in the water distributive pipe 32 is simultaneously injected into the water bag 1 through two ends of the water distributive pipe 32. After the water bag 1 is filled with water, the water in the water distributive pipe 32 continues to be injected into the water bag 1 through the two ends of the water distributive pipe 32. The water in the water bag 1 can be sprayed out through the water orifices 11 for children to play. In the case where the water in the first water inlet pipe 31 is sprayed out through the two ends of the water distributive pipe 32, and the inner diameter of the water distributive pipe 32 is smaller than that of the water bag 1, the water pressure sprayed out can be increased. Moreover, compared with the existing technique, the water sprayed out will not directly impact the inner sidewall of the water bag 1, because the water in the first water inlet pipe 31 firstly flows into the water distributive pipe 32, and then flows out from the two ends of the water distributive pipe 32, which reduces the impact force of the water on the inner side wall of the water bag 1, so that the stability of water jets from the water orifices 11 close to the first water inlet pipe 31 is improved.

All of the above are preferred embodiments of the present application, and are not intended to limit the protection scope of the application. Therefore, all equivalent modification made according to the structure, shape and principle of the application should be covered by the protection scope of the application.

LIST OF REFERENCE SIGNS

1 water bag
11 water orifice
2 base mat
3 water inlet mechanism
31 first water inlet pipe
311 first guide hole
312 guide slot
313 coupling sleeve
314 limit block
315 second guide hole
316 disengagement prevention ring
32 water distributive pipe
321 water inlet opening
33 second water inlet pipe
4 guide pipe
41 guide rod
42 mounting groove
43 sealing ring
44 connecting ring
5 clamping mechanism
51 first sleeve

511 sliding groove
52 mounting block
53 bidirectional screw rod
54 clamp
541 arc-shaped groove
55 grip
6 fastener
61 second sleeve
62 fixing half ring
63 set screw
7 connecting assembly
71 first connecting block
72 second connecting block
73 bolt
74 nut

What is claimed is:

1. A water sprinkler mat, comprising a water bag, a base mat and a water inlet mechanism, the water bag is annular, a radially inner sidewall of the water bag is configured with a plurality of water orifices; an edge of the base mat is fixedly connected to the radially inner sidewall of the water bag; the water inlet mechanism comprises a first water inlet pipe and a water distributive pipe, the first water inlet pipe is inserted in the water bag and is fixedly connected with the water bag, an end of the first water inlet pipe located inside the water bag is closed; the water distributive pipe is located inside the water bag, the first water inlet pipe is configured with a first guide hole, the water distributive pipe extends through the first guide hole and is fixedly connected with the first water inlet pipe; two ends of the water distributive pipe are both open, a water inlet opening is defined at the water distributive pipe, and the water inlet opening is in communication with an inside of the first water inlet pipe.

2. The water sprinkler mat according to claim 1, wherein a guide pipe is fastened on the water bag, the first water inlet pipe extends through the guide pipe and is in sliding fit with the guide pipe; a guide rod is fastened in the guide pipe, the first water inlet pipe is configured with a guide slot, the guide rod is in sliding fit with the guide slot; and the guide pipe is provided with a clamping mechanism for clamping the first water inlet pipe.

3. The water sprinkler mat according to claim 2, wherein the clamping mechanism comprises a first sleeve, a mounting block and a bidirectional screw rod; the first sleeve is fixed to an end of the guide pipe, the first water inlet pipe extends through the first sleeve and is in sliding fit with the first sleeve; two opposite sides of the first sleeve each are configured with a groove, each of the grooves is in communication with an inside of the first sleeve; the grooves are rectangular grooves, a clamp for clamping the first water inlet pipe is slidably provided in each of the grooves; the mounting block is fixed on the first sleeve, the bidirectional screw rod extends through the mounting block and is rotationally connected with the mounting block, the bidirectional screw rod extends through the clamps, and the bidirectional screw rod is screwed to the clamps.

4. The water sprinkler mat according to claim 3, wherein an end of the bidirectional screw rod is fixed with a grip.

5. The water sprinkler mat according to claim 3, wherein a plurality of mounting grooves are defined in the guide pipe, the plurality of mounting grooves are annular grooves; a sealing ring is provided in each of the plurality of mounting grooves, the sealing ring is located between the guide pipe and the first water inlet pipe.

6. The water sprinkler mat according to claim 3, wherein an arc-shaped groove is defined at an end of each of the clamps facing the first water inlet pipe, and an outer sidewall of the first water inlet pipe abuts against an inner sidewall of the arc-shaped groove when the clamps clamp the first water inlet pipe.

7. The water sprinkler mat according to claim 3, wherein a second end of the first water inlet pipe is provided with a coupling sleeve, an end of the coupling sleeve is fixedly provided with a limit block, the limit block is configured with a second guide hole, the first water inlet pipe extends through the second guide hole, the limit block is in sliding fit with the first water inlet pipe; a disengagement prevention ring is fixedly arranged at the second end of the first water inlet pipe, the limit block is slidably arranged between the disengagement prevention ring and the first sleeve, and the coupling sleeve is in engagement with a second water inlet pipe through an internal thread.

8. The water sprinkler mat according to claim 1, wherein the water inlet mechanism further comprises a fixing assembly, the fixing assembly comprises two fasteners; each of the two fasteners comprises a second sleeve and a fixing half ring fixedly connected with each other, the second sleeve is sheathed on the water distributive pipe, an inner sidewall of the second sleeve abuts against an outer sidewall of the water distributive pipe, an inner sidewall of the fixing half ring abuts against an outer sidewall of the first water inlet pipe, the fixing half rings are connected with each other by means of a connecting assembly; a set screw is screwed to the second sleeve, and an end of the set screw abuts against the water distributive pipe.

9. The water sprinkler mat according to claim 8, wherein the connecting assembly comprises a first connecting block, a second connecting block, a bolt and a nut, the first connecting block is fixed on the fixing half ring of a first fastener of the two fasteners, the second connecting block is fixed on the fixing half ring of a second fastener of the two fasteners; the bolt extends through the first connecting block and the second connecting block successively, and the bolt is screwed to the nut.

10. The water sprinkler mat according to claim 1, wherein the plurality of water orifices are evenly distributed along a circumference of the water bag, and an angle between each of axes of the plurality of water orifices and a horizontal direction is 60°.

* * * * *